United States Patent
Chen (10) Patent No.: US 12,024,098 B2
(45) Date of Patent: Jul. 2, 2024

(54) WINDSHIELD TRIM PANEL CLIPS

(71) Applicant: Wen Chen, Parkland, FL (US)

(72) Inventor: Wen Chen, Parkland, FL (US)

(*) Notice: Subject to any disclaimer, the term of this patent is extended or adjusted under 35 U.S.C. 154(b) by 232 days.

(21) Appl. No.: 17/527,015

(22) Filed: Nov. 15, 2021

(65) Prior Publication Data

US 2022/0153208 A1  May 19, 2022

Related U.S. Application Data (60) Provisional application No. 63/114,116, filed on Nov. 16, 2020.

(51) Int. Cl.
*B60R 13/02* (2006.01)
*F16B 5/06* (2006.01)

(52) U.S. Cl.
CPC .......... *B60R 13/0206* (2013.01); *F16B 5/065* (2013.01); *B60R 2013/0287* (2013.01)

(58) Field of Classification Search
CPC ......... B60R 13/0206; B60R 2013/0287; F16B 5/065; F16B 5/126; F16B 5/0657; F16B 2/241; F16B 21/075
See application file for complete search history.

(56) References Cited

U.S. PATENT DOCUMENTS

| | | | | |
|---|---|---|---|---|
| 4,865,505 A * | 9/1989 | Okada | ................. | B60R 13/0206 411/512 |
| 5,533,237 A * | 7/1996 | Higgins | ................ | F16B 21/075 24/297 |
| 5,542,158 A * | 8/1996 | Gronau | ................. | F16B 5/0657 24/297 |
| 6,074,150 A * | 6/2000 | Shinozaki | ........... | B60R 13/0206 24/297 |
| 6,474,616 B2 * | 11/2002 | Yamada | ................. | B60N 2/682 296/43 |
| 6,527,471 B2 * | 3/2003 | Smith | .................... | F16B 5/0614 403/375 |
| 9,080,588 B2 * | 7/2015 | Diez Herrera | ........ | F16B 21/075 |
| 9,630,572 B2 * | 4/2017 | Iwahara | .................. | F16B 5/065 |
| 10,336,265 B2 * | 7/2019 | Dickinson | ............... | F16B 2/243 |
| 10,408,248 B1 * | 9/2019 | Safry | .................... | F16B 21/086 |
| 2006/0290155 A1 * | 12/2006 | Smith | ..................... | B60R 11/00 296/29 |

(Continued)

*Primary Examiner* — Robert Sandy
*Assistant Examiner* — Rowland Do (57) ABSTRACT

The non-destructive fastener clip is a suitable aftermarket replacement for original equipment manufacturer (OEM) trim clip. These OEM trim clips often break upon disassembly from removing an automotive trim panel from an automotive fixture. The non-destructive fastener clip assembly contains an anchor fastener, and a fastener clip. The anchor fastener comprises an anchoring element and a receiving element. The fastener clip comprises an upper fastener portion, a lower fastener portion, at least one connecting element, and at least one latching element. The anchoring element is connected terminally adjacent to the receiving element. The at least one connecting element is distributed about the lower fastener portion. The at least one latching element is distributed about the upper fastener portion. Each of the at least one connecting element is connected adjacent to the receiving element.

17 Claims, 6 Drawing Sheets

(56) References Cited

U.S. PATENT DOCUMENTS

| | | | |
|---|---|---|---|
| 2007/0186389 A1* | 8/2007 | Smith | F16B 21/076 24/297 |
| 2017/0051780 A1* | 2/2017 | Dickinson | F16B 21/076 |
| 2019/0017527 A1* | 1/2019 | Dickinson | F16B 21/075 |
| 2019/0048907 A1* | 2/2019 | Sugiyama | F16B 21/075 |
| 2019/0195262 A1* | 6/2019 | Iwahara | F16B 5/06 |
| 2020/0339044 A1* | 10/2020 | Dickinson | F16B 5/065 |
| 2020/0339045 A1* | 10/2020 | Dickinson | F16B 21/075 |

* cited by examiner

WINDSHIELD TRIM PANEL CLIPS

FIELD OF THE INVENTION

The present invention relates generally to a fastening assembly, more particularly a fastening assembly that is implemented into an automobile trim panel that facilitates repair and non-destructive assembly/disassembly of the automobile trim panel to an automobile panel fixture.

BACKGROUND OF THE INVENTION

Presently, in the field of automobiles the trim panel that is conventional to standard automobiles is designed to break down upon tampering or disassembly. Particularly the clip and hook fastener element that associates a first trim panel located beneath a second trim panel. Further complication may arise as the particular clip and hook fastener element are designed to break, or elsewise the placement and qualities of the trim panels force the first, second, or both trim panels to break at the point of association allotted for the clip and hook fastener element. This in turn requires the individual to bring the vehicle in for repair that may otherwise be lengthy and intrusive and elsewise require time to acquire the appropriate clip and hook fastener element alongside any trim panels potentially. This is consequently so due to the thin material choice of the trim panels and simultaneously the locking, single use construction of the fastener element. It is therefore the objective of this invention to introduce a fastening assembly that comprises a thicker trim panel than is conventional alongside a clip, a fastener clip, and an anchor fastener. Wherein the clip, fastener clip, and anchor fastener assemble, permitting modular disassembly and reassembly of the trim panels. Particularly, through the plurality of anchor wings that substitute the hook fastener element, the assembly permits the association of the first trim panel to the second trim panel modularly. Where further the plurality of anchor wings, and the anchor fastener thereof is associated to the clip and the fastener clip through the plurality of anchor protrusions and the plurality of ridges respectively. Whereupon, the clip further enhances the structural stability of the first panel it is associated to through the top plate, bottom plate, and lateral plate that surround at least one slot-aperture of the first panel. Through the fastener clip connecting to the clip and the anchor fastener, the clip may be tightened and loosened relative to the rotation of the fastener clip within the fastener aperture of the clip. Thus, through the clip and the fastener clip is the first trim panel reinforced at the particular slot-aperture thereat. Further, through the anchor fastener associating to the fastener clip and the clip and locking therewith is a fastening means provided that may be achieved by retrofitting the clip to present vehicles while facilitating association between a first trim panel and a second. Further still, through the plurality of anchor wings afforded to the anchor fastener is the first trim panel and the second trim panel modularly associable to one another.

SUMMARY OF THE INVENTION

The present invention is a non-destructive fastener clip. The non-destructive fastener clip is a suitable aftermarket replacement for original equipment manufacturer (OEM) trim clip. These OEM trim clips often break upon disassembly from removing an automotive trim panel from an automotive fixture. The present invention provides a non-destructive means of fastening the automotive trim panel to the automotive fixture, allowing a user to disassemble the automotive trim panel from the automotive fixture without having to replace the trim clip. The non-destructive fastener clip assembly comprises an anchor fastener, and a fastener clip. The anchor fastener comprises an anchoring element and a receiving element. The fastener clip comprises an upper fastener portion, a lower fastener portion, at least one connecting element, and at least one latching element. The anchoring element is connected terminally adjacent to the receiving element. The at least one connecting element is distributed about the lower fastener portion. The at least one latching element is distributed about the upper fastener portion. Each of the at least one connecting element is connected adjacent to the receiving element, where the at least one connecting element is configured to mount the lower fastener portion of the trim fastener to the receiving element of the anchor fastener. In the first embodiment, the anchor fastener takes the form of an anchoring element that attaches to the automotive fixture. Furthermore, the anchor fastener serves as a means to mount the fastener clip. In the first embodiment, the fastener clip takes the form of a fastening element that attaches the anchor fastener to the automotive trim panel. In the first embodiment, the anchoring element takes form of a connection implement that attaches the anchor fastener to the automotive fixture.

In the first embodiment, the receiving element takes form of a mounting implement that attaches the fastener clip to the anchor fastener. In the first embodiment, the upper fastener portion serves as the primary insertion portion of the fastener clip to the automotive trim panel. More specifically, the upper fastener portion may take the form of a pointed tip that aids in guiding the fastener clip into a corresponding connection point along the automotive trim panel. In the first embodiment, the lower fastener portion serves as the base of the fastener clip that mounts along the anchor fastener. In the first embodiment, the at least one connecting element takes the form of connection tabs that embed and grab along the receiving element of the anchor fastener. This securely attaches the fastener clip to the anchor fastener. In the first embodiment, the at least latching element takes the form of any suitable latching implement that non-destructively attaches the fastener clip to the corresponding connecting point along the automotive trim panel, allowing the user to pry off the automotive trim panel along the automotive trim fixture without damaging the non-destructive fastener clip. In the first embodiment, the anchor fastener is constructed out of a plastic material, such as, but not limited to nylon, acetal, polycarbonate, PEEK, PET, PETG, PBT, or any other suitable polymers. In the first embodiment, the fastener clip is constructed out of a spring-steel material, specifically spring steel material with very high yield strength such that the fastener clip is able to retain its original shape upon significant deflection or bending.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-6, the present invention is a non-destructive trim fastener assembly 1. The non-destructive trim fastener assembly 1 is a suitable aftermarket replacement for original equipment manufacturer (OEM) trim clip. These OEM trim clips often break upon disassembly from removing an automotive trim panel from an automotive fixture. The present invention provides a non-destructive means of fastening the automotive trim panel to the automotive fixture, allowing a user to disassemble the automotive trim panel from the automotive fixture without having to replace the trim clip. In reference to FIGS. 2-6, the non-destructive trim fastener assembly 1 comprises an anchor fastener 11, and a fastener clip 12. The anchor fastener 11 comprises an anchoring element 111 and a receiving element 112. The fastener clip 12 comprises an upper fastener portion 121, a lower fastener portion 122, at least one connecting element 123, and at least one latching element 124. The anchoring element 111 is connected terminally adjacent to the receiving element 112. The at least one connecting element 123 is distributed about the lower fastener portion 122. The at least one latching element 124 is distributed about the upper fastener portion 121. Each of the at least one connecting element 123 is connected adjacent to the receiving element 112, where the at least one connecting element 123 is configured to mount the lower fastener portion 122 of the trim fastener to the receiving element 112 of the anchor fastener 11. In the first embodiment, the anchor fastener 11 takes the form of an anchoring element 111 that attaches to the automotive fixture. Furthermore, the anchor fastener 11 serves as a means to mount the fastener clip 12. In the first embodiment, the fastener clip 12 takes the form of a fastening element that attaches the anchor fastener 11 to the automotive trim panel. In the first embodiment, the anchoring element 111 takes form of a connection implement that attaches the anchor fastener 11 to the automotive fixture.

In the first embodiment, the receiving element 112 takes form of a mounting implement that attaches the fastener clip 12 to the anchor fastener 11. In the first embodiment, the upper fastener portion 121 serves as the primary insertion portion of the fastener clip 12 to the automotive trim panel. More specifically, the upper fastener portion 121 may take the form of a pointed tip that aids in guiding the fastener clip 12 into a corresponding connection point along the automotive trim panel. In the first embodiment, the lower fastener portion 122 serves as the base of the fastener clip 12 that mounts along the anchor fastener 11. In the first embodiment, the at least one connecting element 123 takes the form of connection tabs that embed and grab along the receiving element 112 of the anchor fastener 11. This securely attaches the fastener clip 12 to the anchor fastener 11. In the first embodiment, the at least latching element takes the form of any suitable latching implement that non-destructively attaches the fastener clip 12 to the corresponding connecting point along the automotive trim panel, allowing the user to pry off the automotive trim panel along the automotive trim fixture without damaging the non-destructive trim fastener assembly 1. In the first embodiment, the anchor fastener 11 is constructed out of a plastic material, such as, but not limited to nylon, acetal, polycarbonate, PEEK, PET, PETG, PBT, or any other suitable polymers. In the first embodiment, the fastener clip 12 is constructed out of a spring-steel material, specifically spring steel material with very high yield strength such that the fastener clip 12 is able to retain its original shape upon significant deflection or bending.

Figure 1:
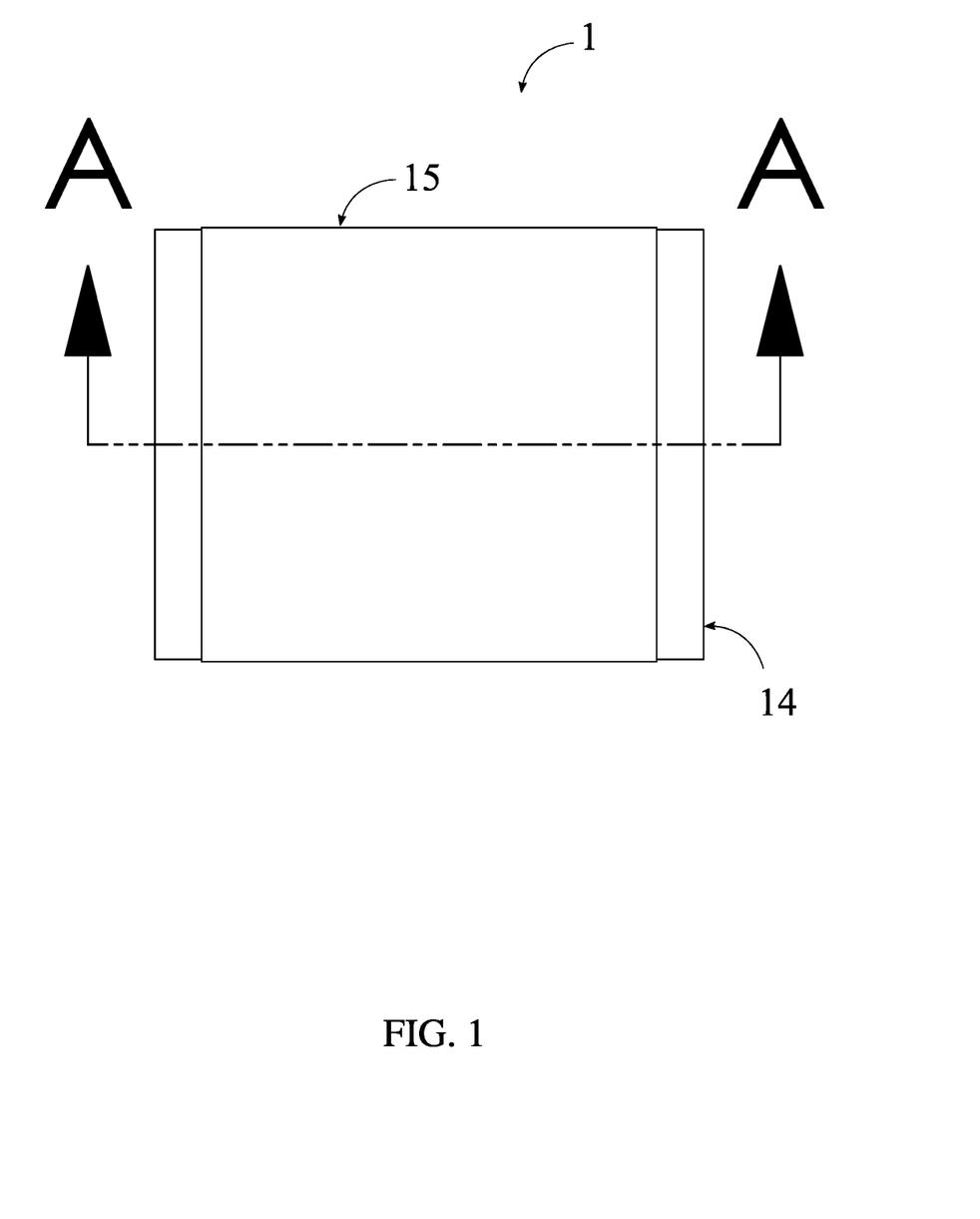
FIG. 1 is a top view of the present invention installed between a fixture connector and a second fixture connector.
Figure 2:
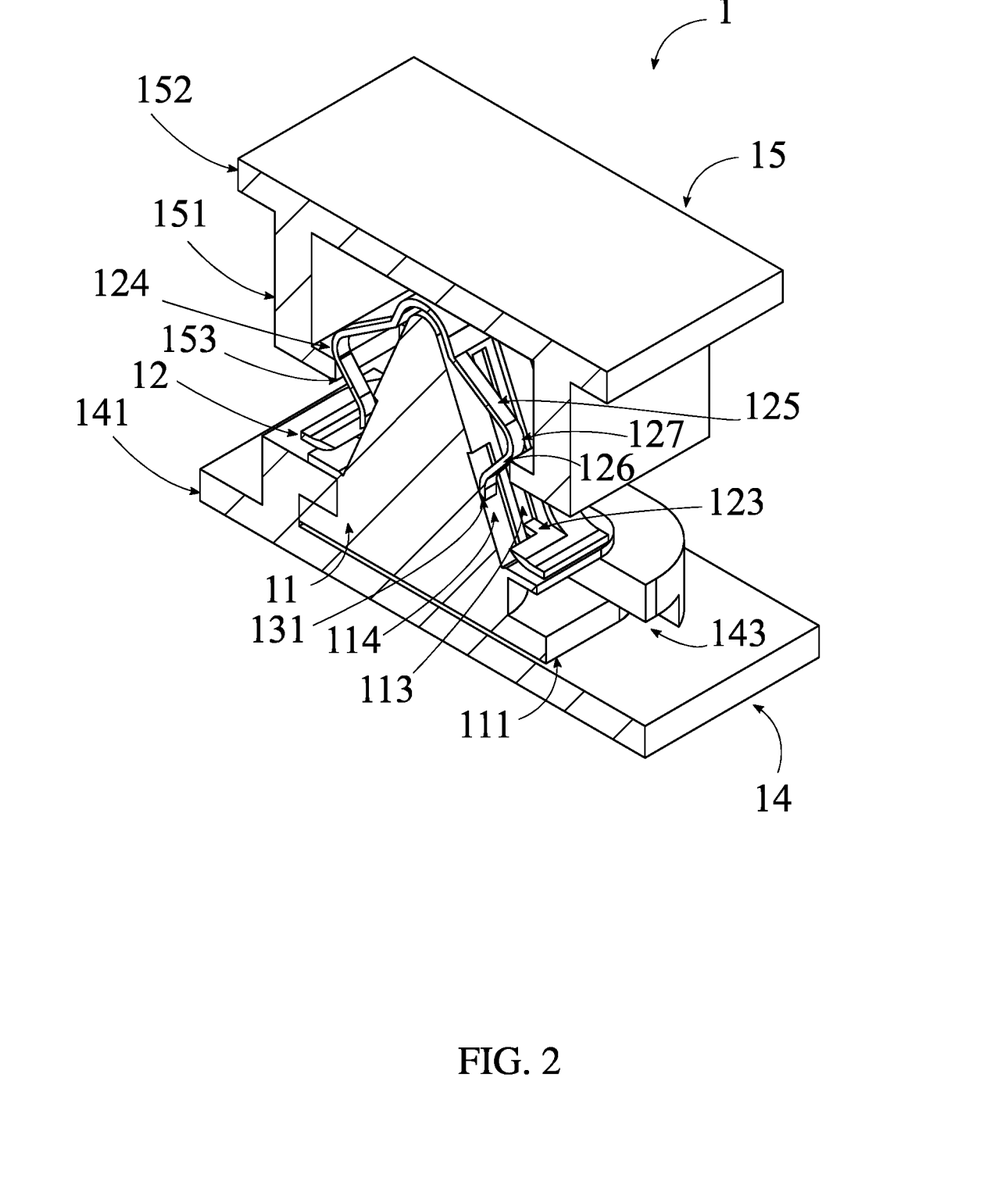
FIG. 2 is a cross sectional perspective view of the present invention taken along cutting lines A-A in FIG. 1.
Figure 4:
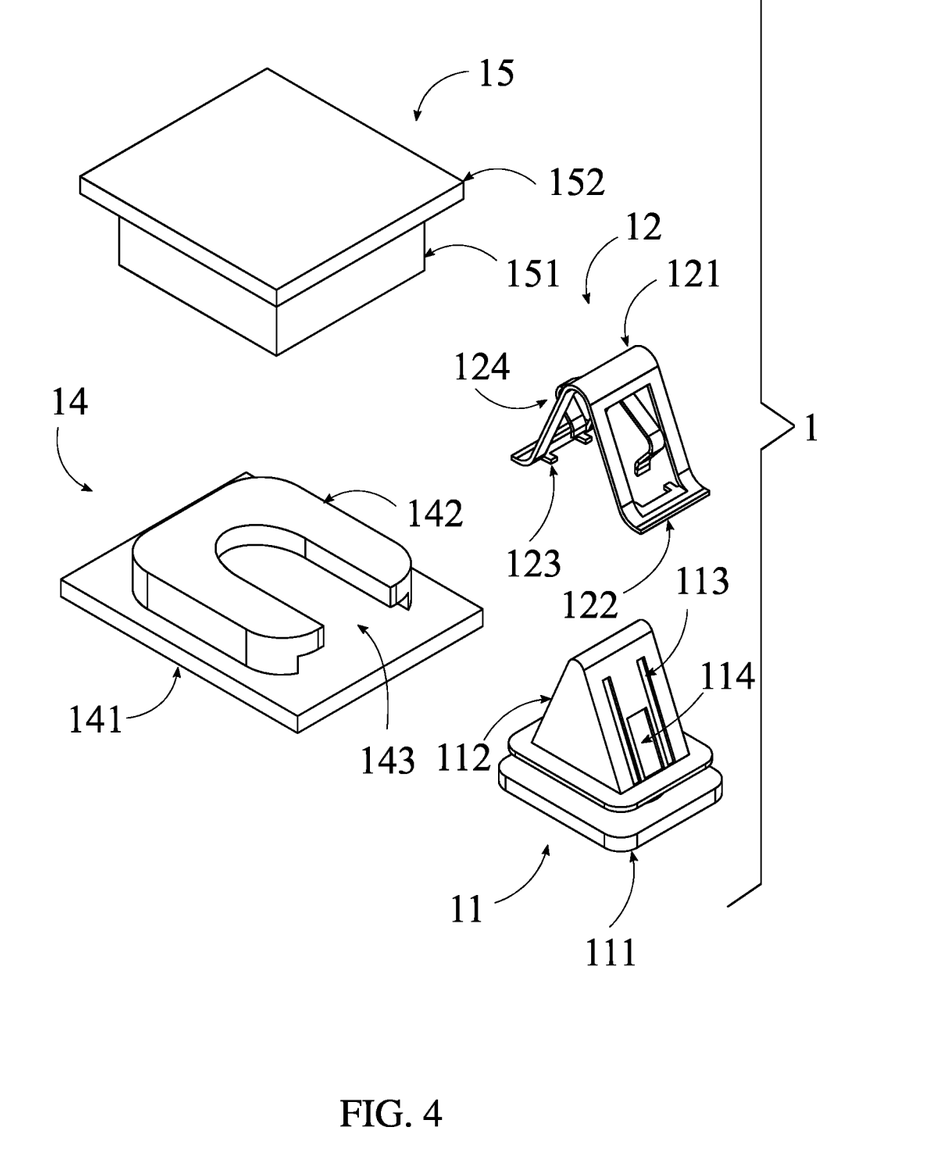
FIG. 4 is an exploded top perspective of the present invention.
Figure 5:
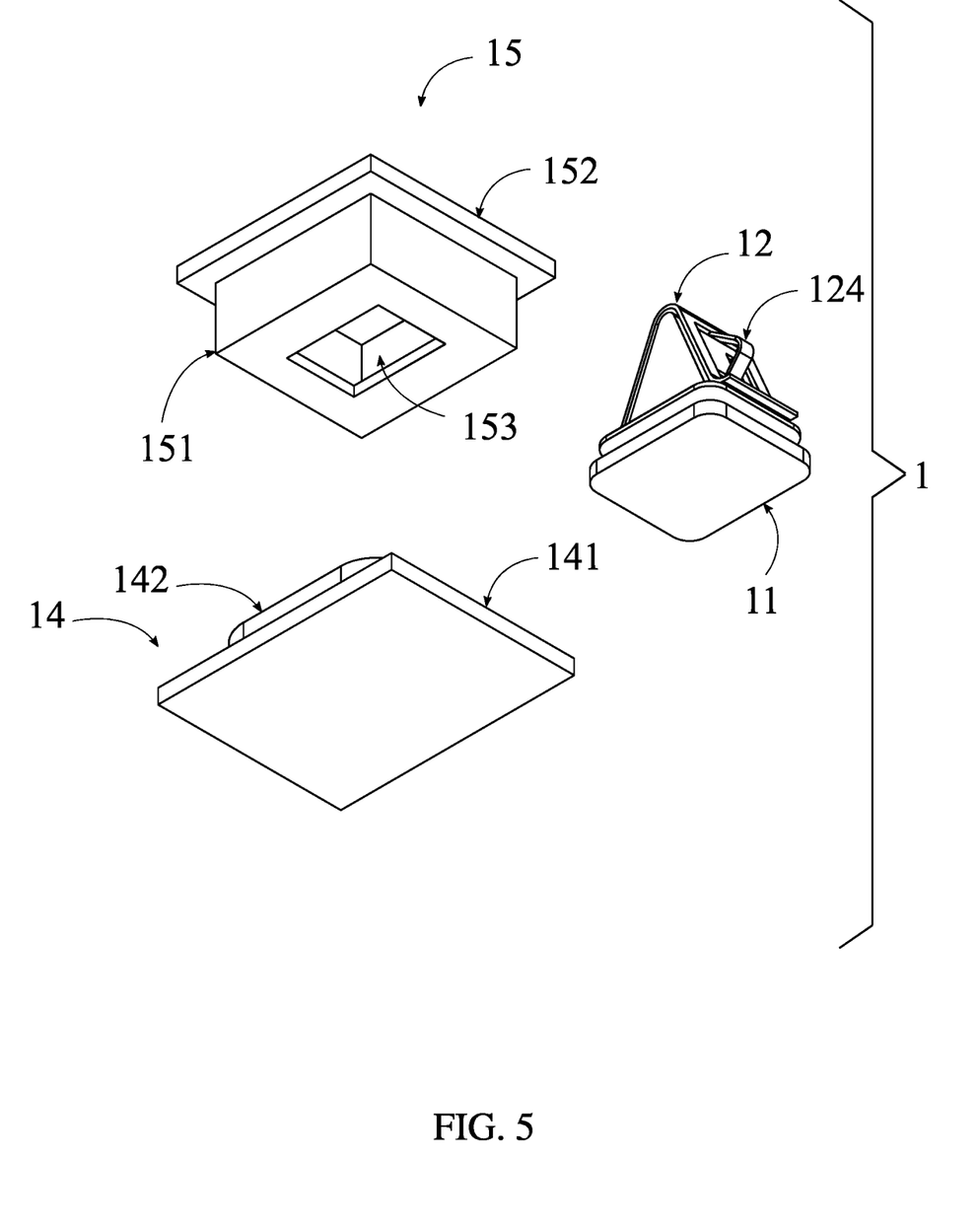
FIG. 5 is an exploded bottom perspective view of the present invention.
Figure 6:
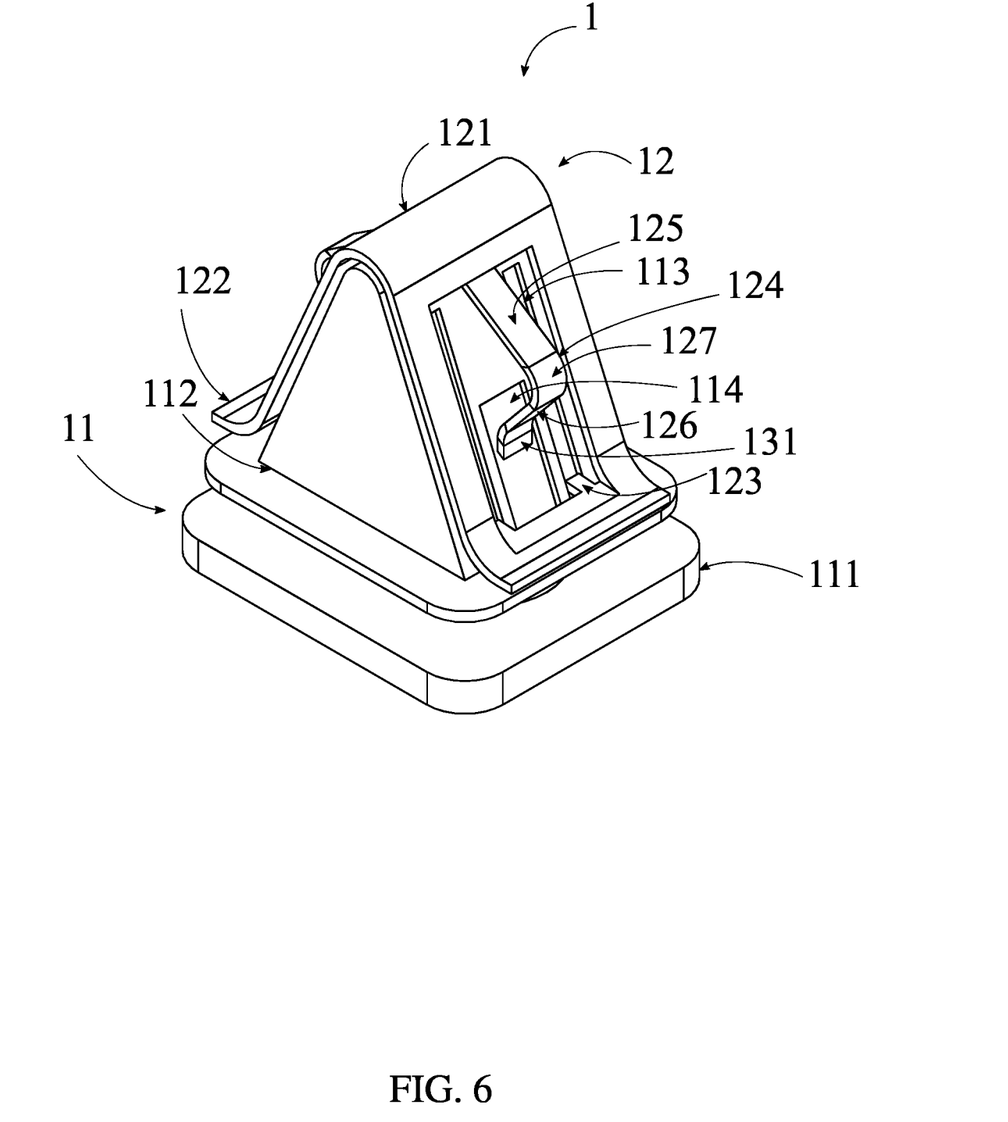
FIG. 6 is a top perspective view of the present invention.

In reference to FIGS. 2, 4, and 6, the anchor fastener 11 further comprises at least one first mounting slot 113. The at least one first mounting slot 113 is distributed about the receiving element 112. Each of the at least one connecting element 123 is connected to each of the at least one first mounting slot 113. In reference to FIGS. 2, 4, and 6, the anchor fastener 11 further comprises at least one second mounting slot 114. The at least second mounting slot 114 is distributed about the receiving element 112. Each of the at least one latching element 124 is connected to each of the at least one second mounting slot 114. In the first embodiment, the at least one first mounting slot 113 takes the form of mounting grooves along the receiving element 112 where the at least one first mounting slot 113 is configured to receive the at least one connection element such that the at least one connection element does not slip or disengage from the receiving element 112. In the first embodiment, the at least one second mounting slot 114 takes the form of mounting grooves along the receiving element 112 where the at least one second mounting slot 114 is configured to receive the at least one latching element 124 such that the at least one latching element 124 stays co-linear along the receiving element 112. More specifically, the at least one latching element 124 is able to slide along the at least one second mounting slot 114, such that the at least one second mounting slot 114 guides the at least one latching element 124 along the receiving element 112.

Figure 3:
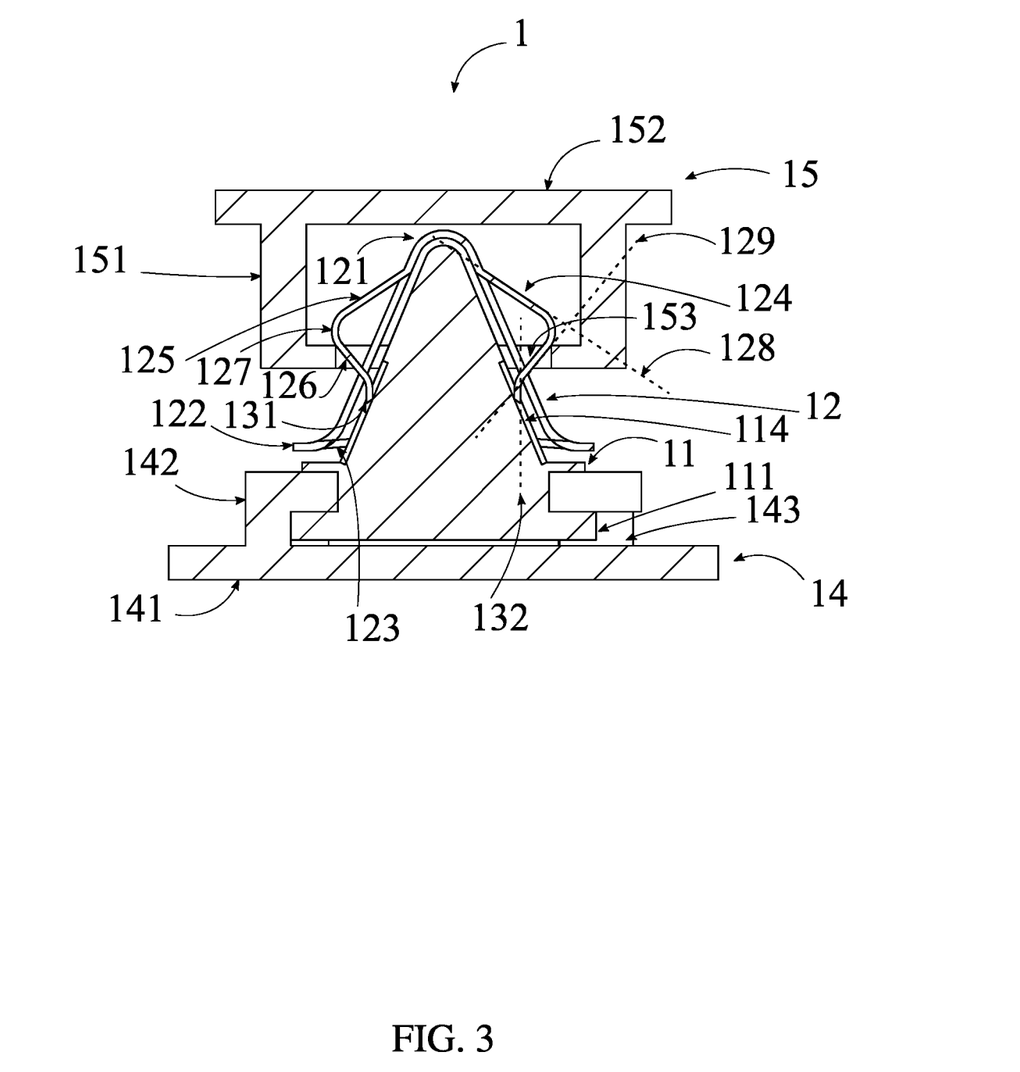
FIG. 3 is a cross sectional front view of the present invention taken along cutting lines A-A in FIG. 1.

In reference to FIG. 3, each of the at least one latching element 124 comprises a first flange 125 and a second flange 126. In reference to FIG. 3, each of the at least one latching element 124 further comprises a latch engagement corner 127. The first flange 125 is connected adjacent to the fastener clip 12 in accordance with a specified first angle 128. The second flange 126 is connected adjacent to the first flange 125, opposite to the fastener clip 12, and in accordance with a specified second angle 129 along the first flange 125. The latch engagement corner 127 is positioned between the first flange 125 and the second flange 126. In the first embodiment, the first flange 125 is projected away from the fastener clip 12 in accordance with the specified first angle 128. The specified first angle 128 displacement ranges from 0-90 degrees. The second flange 126 is project toward the fastener clip 12 to the at least one second mounting slot 114, forming the latch engagement corner 127. The specified second angle 129 displacement ranges from 0-90 degrees. In the first embodiment, the latch engagement corner 127 is round in shape such that the at least one latching element 124 attaches along the fastener aperture 153 without seizing, damaging, or wearing out the fastener clip 12 or fastener aperture 153 upon engagement or disengagement of the vehicle trim panel along the mounting fixture. In the first embodiment, the at least one latching element 124 is a spring latch. More specifically, the at least one latching element 124 serves as a spring-like latch that attaches along the corresponding connecting point along the automotive trim panel. In reference to FIG. 3, each of the at least one latching element 124 further comprises a third flange 131. The at least second mounting slot is distributed about the receiving element 112. The third flange 131 is connected adjacent to the second flange 126, opposite to the first flange 125, and in accordance with a specified third angle 132 along the second flange 126. The third flange 131 is positioned adjacent to the one of the at least one second mounting slot 114, where the third flange 131 is configured to slide along one of the at least one second mounting slot 114. In the first embodiment, the third flange 131 is projected away from the receiving element 112 in the specified third angle 132 ranging from 0-90 degrees. More specifically, the third flange 131 serves as a hemmed end of the at least one latching element 124 such that at least one latching element 124 is able to slide along the at least one second mounting slot 114 without binding, embedding, or seizing.

In reference to FIGS. 1-5, the non-destructive trim fastener assembly 1 further comprises a first connector insert 14. The first connector insert 14 comprises a first mounting body 141 and an anchor receiver 142. The anchor receiver 142 is connected adjacent to the first mounting body 141. The receiving element 112 is connected adjacent to the anchor receiver 142. In reference to FIGS. 2-4, the first connector insert 14 further comprises an anchoring slot 143. The anchoring slot 143 traverses into the anchor receiver 142. The anchoring element 111 is slidably connecting to the anchoring slot 143. In a second embodiment, the first connector insert 14 serves as a connection insert that installs along the automotive fixture to form the corresponding connection point to attach the anchor fastener 11 to the automotive fixture. This accommodates automotive fixtures with broken or unsupported connection points often associated with automotive fixtures that utilize adhesives, plastic welds, or destructive trim clips to fasten on the automotive trim panel. In the second embodiment, the first mounting body 141 serves as the installation portion of the first connector insert 14 that allows the user to install the first connector insert 14 to the automotive fixture to form the corresponding connection point. The first mounting body 141 is installed along the automotive fixture through the use of any suitable fastening means, such as, but not limited to fastening bolts, adhesives, plastic welds, or any other suitable method. The anchor receiver 142 takes the form of a corresponding mounting implement, such as but not limited to mounting slots, mounting bolts, or any other mounting element that connects the anchoring element 111 of the anchor fastener 11 to the first mounting body 141. In one embodiment, the anchoring slot 143 takes the form of a mounting slot that allows the receiving element 112 to slide and connect into the anchor receiver 142.

In reference to FIGS. 1-5, the non-destructive trim fastener assembly 1 comprises a second connector insert 15. The second connector insert 15 comprises a fastener receiver 151 and a second mounting body 152. The fastener receiver 151 is connected adjacent to the second mounting body 152. The fastener clip 12 is removably attached to the fastener receiver 151 through the at least one latching element 124. In reference to FIGS. 2-3 and 5, the second connector insert 15 further comprises a fastener aperture 153. The fastener aperture 153 traverses into the fastener receiver 151. The fastener clip 12 is removably attached to the fastener aperture 153 through the at least one latching element 124. In the second embodiment, the second connector insert 15 serves as a connection insert that installs along the automotive trim panel to form the corresponding connection point to attach the fastener clip 12 to the automotive trim panel. This accommodates automotive trim panels with broken or unsupported connection points often associated with automotive trim panels that utilize adhesives, plastic welds, or destructive trim clips to fasten the automotive trim panel to the automotive fixture. In the second embodiment, the second mounting body 152 serves as the installation portion of the second connector insert 15 that allows the user to install the second connector insert 15 to the automotive trim panel to form the corresponding connection point. The second mounting body 152 is installed along the automotive trim panel through the use of any suitable fastening means, such as, but not limited to fastening bolts, adhesives, plastic welds, or any other suitable method. The fastener receiver 151 takes the form of a corresponding mounting implement, such as but not limited to mounting apertures, mounting slots, or any other mounting element that connects the at least one latching element 124 of the fastener clip 12 to the second mounting body 152. In one embodiment, the fastening aperture takes the form of a mounting aperture that allows the at least one latching element 124 of the fastener clip 12 to engage along the mounting aperture such that the fastener clip 12 is connected to the fastener receiver 151.

Although the invention has been explained in relation to its preferred embodiment, it is to be understood that many other possible modifications and variations can be made without departing from the spirit and scope of the invention as hereinafter claimed.

What is claimed is:

1. A non-destructive fastener clip assembly comprising:
   an anchor fastener;
   a fastener clip;
   the anchor fastener comprising an anchoring element and a receiving element;
   the fastener clip comprising an upper fastener portion, a lower fastener portion, at least one connecting element, and at least one latching element;
   the anchoring element being connected terminally adjacent to the receiving element;
   the at least one connecting element being distributed about the lower fastener portion;
   the at least one latching element being distributed about the upper fastener portion;
   each of the at least one connecting element being connected adjacent to the receiving element, wherein the at least one connecting element is configured to mount the lower fastener portion to the receiving element of the anchor fastener;
   a first connector insert and a second connector insert;
   the second connector insert comprising a fastener receiver and a second mounting body;
   the first connector insert comprising a first mounting body and an anchor receiver;
   the anchor receiver being connected adjacent to the first mounting body;
   the receiving element being connected adjacent to the anchor receiver;
   the fastener receiver being connected adjacent to the second mounting body; and
   the fastener clip being removably attached to the fastener receiver through the at least one latching element.

2. The non-destructive fastener clip assembly as claimed in claim 1 comprising:
the anchor fastener further comprising at least one first mounting slot;
the at least one first mounting slot being distributed about the receiving element; and
each of the at least one connecting element being connected to each of the at least one first mounting slot.

3. The non-destructive fastener clip assembly as claimed in claim 1 comprising:
the anchor fastener further comprising at least one second mounting slot;
the at least second mounting slot being distributed about the receiving element; and
each of the at least one latching element being connected to each of the at least one second mounting slot.

4. The non-destructive fastener clip assembly as claimed in claim 1 comprising:
the anchor fastener further comprising at least one first mounting slot and at least one second mounting slot;
the at least one first mounting slot and the at least one second mounting slot being distributed about the receiving element, according to a specified pattern;
each of the at least one connecting element being connected to each of the at least one first mounting slot; and
each of the at least one latching element being connected to each of the at least one second mounting slot.

5. The non-destructive fastener clip assembly as claimed in claim 1 comprising:
each of the at least one latching element comprising a first flange and a second flange;
the first flange being connected adjacent to the fastener clip according to a specified first angle;
the second flange being connected adjacent to the first flange, opposite to the fastener clip, and according to a specified second angle along the first flange.

6. The non-destructive fastener clip assembly as claimed in claim 5 comprising:
each of the at least one latching element further comprising a latch engagement corner;
the latch engagement corner being positioned between the first flange and the second flange.

7. The non-destructive fastener clip assembly as claimed in claim 6, wherein the latch engagement corner is round in shape.

8. The non-destructive fastener clip assembly as claimed in claim 5 comprising:
the anchor fastener further comprising at least one second mounting slot;
each of the at least one latching element further comprising a third flange;
the at least second mounting slot being distributed about the receiving element;
the third flange being connected adjacent to the second flange, opposite to the first flange, and according to a specified third angle along the second flange; and
the third flange being positioned adjacent to one of the at least one second mounting slot, wherein the third flange is configured to slide along one of the at least one second mounting slot.

9. The non-destructive fastener clip assembly as claimed in claim 1 comprising:
each of the at least one latching element comprising a first flange, a latch engagement corner and a second flange;
the first flange being connected adjacent to the fastener clip according to a specified first angle;
the second flange being connected adjacent to the first flange, opposite to the fastener clip, and according to a specified second angle along the first flange; and
the latch engagement corner being positioned between the first flange and the second flange.

10. The non-destructive fastener clip assembly as claimed in claim 1 comprising:
the anchor fastener further comprising at least one second mounting slot;
each of the at least one latching element comprising a first flange, a second flange and a third flange;
the first flange being connected adjacent to the fastener clip according to a specified first angle;
the second flange being connected adjacent to the first flange, opposite to the fastener clip, and according to a specified second angle along the first flange;
the at least second mounting slot being distributed about the receiving element;
the third flange being connected adjacent to the second flange, opposite to the first flange, and according to a specified third angle along the second flange; and
the third flange being positioned adjacent to the one of the at least one second mounting slot, wherein the third flange is configured to slide along one of the at least one second mounting slot.

11. The non-destructive fastener clip assembly as claimed in claim 1 comprising:
the first connector insert further comprising an anchoring slot;
the anchoring slot traversing into the anchor receiver; and
the anchoring element being slidably connecting to the anchoring slot.

12. The non-destructive fastener clip assembly as claimed in claim 1 comprising:
the second connector insert further comprising a fastener aperture;
the fastener aperture traversing into the fastener receiver; and
the fastener clip being removably attached to the fastener aperture through the at least one latching element.

13. The non-destructive fastener clip assembly as claimed in claim 1, wherein the anchor fastener is constructed out of a plastic material.

14. The non-destructive fastener clip assembly as claimed in claim 1, wherein the fastener clip is constructed out of a spring-steel material.

15. The non-destructive fastener clip assembly as claimed in claim 1, wherein the at least one latching element is a spring latch.

16. A non-destructive fastener clip assembly comprising:
an anchor fastener;
a fastener clip;
the anchor fastener comprising an anchoring element and a receiving element;
the fastener clip comprising an upper fastener portion, a lower fastener portion, at least one connecting element, and at least one latching element;
each of the at least one latching element comprising a first flange and a second flange;
the anchoring element being connected terminally adjacent to the receiving element;
the at least one connecting element being distributed about the lower fastener portion;
the at least one latching element being distributed about the upper fastener portion;
each of the at least one connecting element being connected adjacent to the receiving element, wherein the at least one connecting element is configured to mount the lower fastener portion to the receiving element of the anchor fastener;

the first flange being connected adjacent to the fastener clip according to a specified first angle;

the second flange being connected adjacent to the first flange, opposite to the fastener clip, and according to a specified second angle along the first flange;

a first connector insert and a second connector insert;

the second connector insert comprising a fastener receiver and a second mounting body;

the first connector insert comprising a first mounting body and an anchor receiver;

the anchor receiver being connected adjacent to the first mounting body;

the receiving element being connected adjacent to the anchor receiver;

the fastener receiver being connected adjacent to the second mounting body; and the fastener clip being removably attached to the fastener receiver through the at least one latching element.

17. A non-destructive fastener clip assembly comprising:

an anchor fastener;

a fastener clip;

the anchor fastener comprising an anchoring element, at least one first mounting slot, at least one second mounting slot, and a receiving element;

the fastener clip comprising an upper fastener portion, a lower fastener portion, at least one connecting element, and at least one latching element;

the anchoring element being connected terminally adjacent to the receiving element;

the at least one connecting element being distributed about the lower fastener portion;

the at least one latching element being distributed about the upper fastener portion;

each of the at least one connecting element being connected adjacent to the receiving element, wherein the at least one connecting element is configured to mount the lower fastener portion to the receiving element of the anchor fastener;

the at least one first mounting slot and the at least one second mounting slot being distributed about the receiving element, according to a specified pattern;

each of the at least one connecting element being connected to each of the at least one first mounting slot;

each of the at least one latching element being connected to each of the at least one second mounting slot;

a first connector insert and a second connector insert;

the second connector insert comprising a fastener receiver and a second mounting body;

the first connector insert comprising a first mounting body and an anchor receiver;

the anchor receiver being connected adjacent to the first mounting body;

the receiving element being connected adjacent to the anchor receiver;

the fastener receiver being connected adjacent to the second mounting body; and the fastener clip being removably attached to the fastener receiver through the at least one latching element.

* * * * *